Patented Aug. 31, 1943

2,328,249

UNITED STATES PATENT OFFICE 2,328,249

COATING COMPOSITION

Ladislaus Balassa, Flint, Mich., assignor to E. I. du Pont de Nemours & Company, Wilmington, Del., a corporation of Delaware No Drawing. Application July 12, 1940, Serial No. 345,178

7 Claims. (Cl. 260—22)

This invention relates to protective and decorative coating compositions and more particularly to compositions in which the pigment is primarily calcined vermiculite.

It is therefore an object of this invention to produce new and useful pigmented coating compositions using calcined vermiculite which results in a relatively low cost. It is also an object of this invention to produce pigmented coating compositions which have excellent resistance against chipping and cracking and also have a rapid drying rate.

It is a still further object of this invention to produce compositions which not only dry rapidly but so do without lifting when subsequent coats of lacquers or enamels are applied. This object is accomplished even though the pigment-binder ratio is comparatively low. Another object of the invention is to produce durable undercoats for lacquers which offer better anchorage for the top coat than has been hitherto possible without the use of silica or similar coarse pigments. Another object of the invention is to produce undercoats which bake to a hard film at comparatively high builds and which have a smooth surface texture without sanding and do not materially reduce the gloss of subsequent lacquer or enamel finishes. Other objects will appear as the description of the invention proceeds.

These objects are accomplished by incorporating calcined vermiculite, alone or with other pigment combinations in a suitable vehicle. The calcined vermiculite pigment is prepared by heating it at least to a temperature which is sufficient to drive off a substantial part or all of the water of composition and of crystallization, but not high enough to fuse the resulting product. Temperatures of about 600° C. to 750° C. produce the best results. After the vermiculite is calcined, it is screened and ground as is customary with similar known pigments.

The vehicles suitable for this invention are those of the drying oil type which may have a natural or synthetic resin incorporated therein. The following examples illustrate typical compositions of this type. The calcined vermiculite should form a substantial part of the pigment combination in the composition, and I have found that more specifically, amounts between 20% and 60% of the total combination give the best results. The ratio of pigment to binder in the vehicle can be readily adjusted to serve the purpose with due regard for the required speed of drying, flexibility, and film toughness. It will also be apparent that for some uses, such as a priming coat, the composition should have a high pigment-binder ratio. For other uses a low pigment-binder ratio may be used, and it will be found that the pigment herein disclosed is well suited for this type of composition. The following examples illustrate but do not limit certain embodiments of the invention.

EXAMPLE 1

Primer-surfacer

| | Parts by weight |
|---|---|
| Resin A solution | 26.4 |
| Vermiculite (calcined) | 13.2 |
| Blanc fixe | 24.0 |
| Titanium dioxide | 7.0 |
| High solvency petroleum naphtha | 29.0 |
| Lead naphthenate solution (16% Pb) | .2 |
| Manganese naphthenate solution (3% Mn) | .2 |
| | 100.0 |

EXAMPLE 2

Primer

| | Parts by weight |
|---|---|
| Varnish A | 45.5 |
| Vermiculite (calcined) | 20.0 |
| Whiting | 20.0 |
| Lamp black | 5.0 |
| Oleum spirits | 9.0 |
| Iron naphthenate solution (6% Fe) | .5 |
| | 100.0 |

The calcined vermiculite for the above compositions was obtained through calcination of vermiculite at 600° C. for one hour in a rotary calciner.

Resin A solution, used in Example 1, is an oil modified alkyd resin and was formed from the following ingredients, using the proportions indicated:

| | Per cent |
|---|---|
| Phthalic anhydride | 19.99 |
| Glycerol | 8.72 |
| Litharge | .03 |
| Linseed oil | 28.74 |
| High solvency petroleum naphtha | 42.52 |
| | 100.00 |

Varnish A, used in Example 2, is a modified rosin varnish and was formed from the following ingredients, using the proportions indicated:

| | Per cent |
|---|---|
| Rosin | 14.98 |
| Calcium hydrate | .60 |
| Tung oil | 35.21 |
| Mineral spirits | 49.21 |
| | 100.00 |

The lead naphthenate solution contains 16% Pb. The manganese naphthenate solution contains 3% Mn. The iron naphthenate solution contains 6% Fe.

The coating compositions set forth above, as well as other coating compositions falling within the scope of the present invention, are prepared by grinding or dispersing the pigment combinations with the resin or varnish in the presence of sufficient solvent to provide a consistency suited to the dispersing device used. After dispersion, the paint is reduced to application consistency with additional solvent. The naphthenate drier may be added at any desired point in the preparation of the coating composition.

Where desired, extenders or prime pigments, such as silica, asbestine, talc, calcined asbestine, calcined talc, lead chromate, zinc chromate, white lead, etc., may be incorporated in the coating composition falling within the scope of the present invention in amount disclosed above.

The use of zinc oxides, litharge, red lead, basic calcium silicates, or other basic pigments, in combination with calcined vermiculite, falls within the scope of this invention.

The polyhydric alcohol-polybasic acid resin referred to above may be made in any well known manner as, for example, by heating the ingredients at any suitable temperature above the melting point of the materials until resinification is complete. If desired, refluxing or partial refluxing may be resorted to or the operation may be carried out at elevated or reduced pressures.

In general, it is advisable to maintain the acid number of the resin at the lowest possible value and this is usually accomplished by increasing the temperature or the period of heating, but stopping before the gel point is reached. The allowable range of acid numbers will vary with the type of pigments used. With chemically active pigments, like zinc oxide or basic carbonate white lead, the acid number should preferably be below 20. With chemically inert pigments, the question of acid number is not as important.

By the term "modified polyhydric alcohol-polybasic acid resin," as used herein, I mean the resinous condensation product resulting from the reaction of one or more polyhydric alcohols and one or more polybasic acids, with one or more of the following ingredients: drying oils, semi-drying oils, synthetic drying oils and monobasic acids, especially those derived from drying oils or semi-drying oils, synthetic drying oil acids and mixtures of one or more of these modifying ingredients with natural resins, chlorinated rubber, as well as other equivalent products.

I found that the optimum results could be obtained, for the purpose of this invention, with polyhydric alcohol-polybasic acid resins in which the oil modifier did not fall below 35% and did not exceed 70% of resin composition. Resins, other than the above, however, may also be pigmented with calcined vermiculite and fall within the scope of this invention.

The varnish referred to above may be made by any manner known to the art; for example, by heating the ingredients at any suitable temperature above the melting point of the ingredients until a homogeneous product of the desired dry and physical properties is obtained. If desired, the gum may be run first or the oil may be bodied, as the case may be.

The term "resin" is used herein to include a natural resin, like rosin, Congo, East India, damar, etc., or a synthetic or semi-synthetic resinous product, like "Bakelite," "Amberol," indene, chlorinated rubber, cellulose esters or ether, etc. The term "oil" includes drying oils, semi-drying oils, synthetic drying oils, as well as products of an oily nature which are suitable plasticizers for the above resins.

I found that, for the purpose of this invention, where an oil vehicle is used, optimum results are obtained where the oil-resin ratio does not fall below 35% oil to 65% resin and does not exceed 70% oil to 30% resin, although a higher oil content or even a straight oil without resin falls within the scope of this invention.

The term "calcined vermiculite" is used herein to include the group of compounds having as their main components magnesium, iron, aluminum and silica, chemically combined, and with or without water of composition and water of crystallization. These compounds are obtained from a group of minerals known as vermiculites. These vermiculites, to which usually the following structural formula is ascribed:

$OH_2(MgFe)_3(SiAlFe)_4O_{10}4H_2O$ are calcined at or above a temperature which is sufficient to drive out part of or all of the water of composition and the water of crystallization, but not high enough to fuse the resulting product. I found that calcination temperatures between 600° C. and 750° C. produce compounds with the optimum properties.

The advantages which flow from the use of calcined vermiculites are that they have increased weatherability with organic liquids usually used in paints. They also are easier to grind, increase the drying potential of paints and increase the touchness and the adhesion of the films to the substrates. The adhesion of enamel and lacquer top coats to the undercoats is also increased by the use of calcined vermiculite in the undercoats.

It is apparent that many widely different embodiments of this invention may be made without departing from the spirit and scope thereof and, therefore, it is not intended to be limited except as indicated in the appended claims.

I claim:

1. A pigmented coating composition comprising a vehicle consisting of organic film-forming material which on drying yields a resinous film and a plurality of pigments, said composition containing anhydrous calcined vermiculite which has been calcined at 600° C. to 750° C. in the amount of 26 to 60 per cent of the total pigment in the said composition.

2. The composition of claim 1 in which the vehicle contains a drying oil.

3. The composition of claim 1 in which the vehicle contains a drying oil and a resin.

4. The composition of claim 1 in which the vehicle contains an alkyd resin modified with a drying oil.

5. The composition of claim 1 in which the vehicle contains an oil and a resin in the ratio of between 35 and 70 parts of oil to 65 and 30 parts of resin.

6. A coating composition comprising an oil modified alkyd resin, vermiculite calcined at 600° C. to 750° C., other pigment, solvent, and drier.

7. A coating composition having the approximate following composition:

| | Per cent |
|---|---|
| Oil modified alkyd resin solution (about 58% solids) | 26.4 |
| Vermiculite (calcined at 600 to 750° C.) | 13.2 |
| Blanc fixe | 24.0 |
| Titanium dioxide | 7.0 |
| High solvency petroleum naphtha | 29.0 |
| Lead naphthenate solution (16% Pb) | .2 |
| Manganese naphthenate solution (3% Mn) | .2 |

LADISLAUS BALASSA.